Jan. 24, 1961 W. M. SCOTT, JR 2,969,421
LOW X BUS
Filed July 12, 1957 2 Sheets-Sheet 1
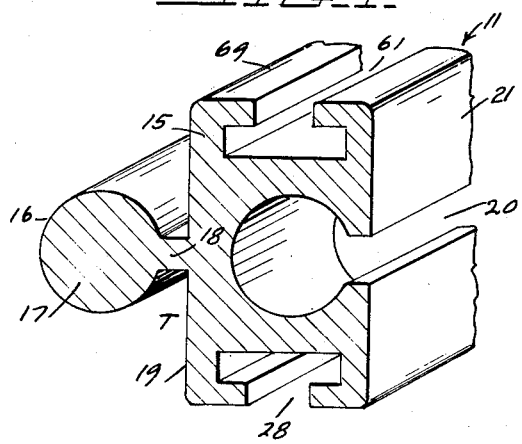
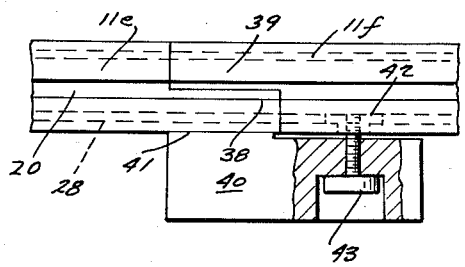
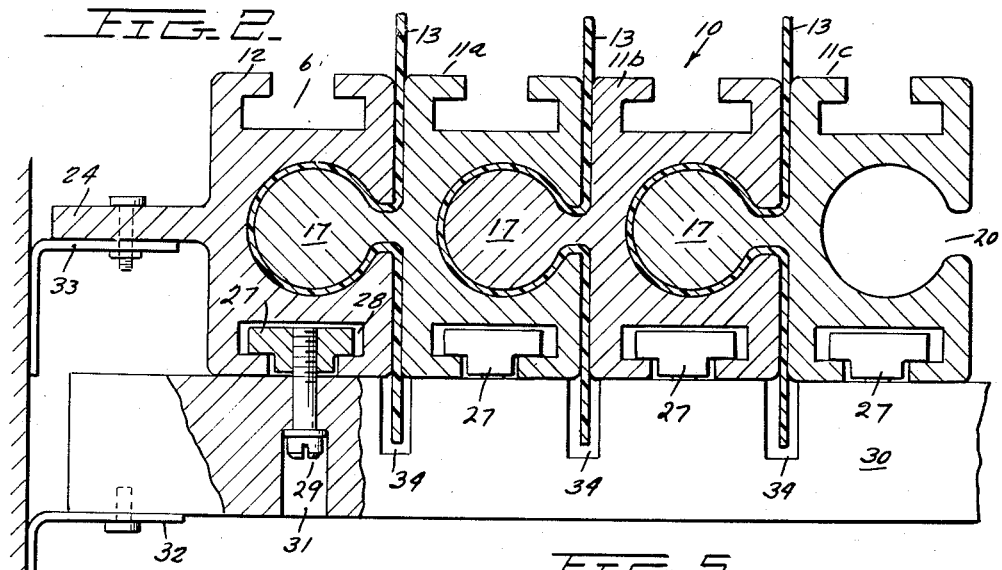
INVENTOR.
WILLIAM M. SCOTT, JR.
BY
ATTORNEYS

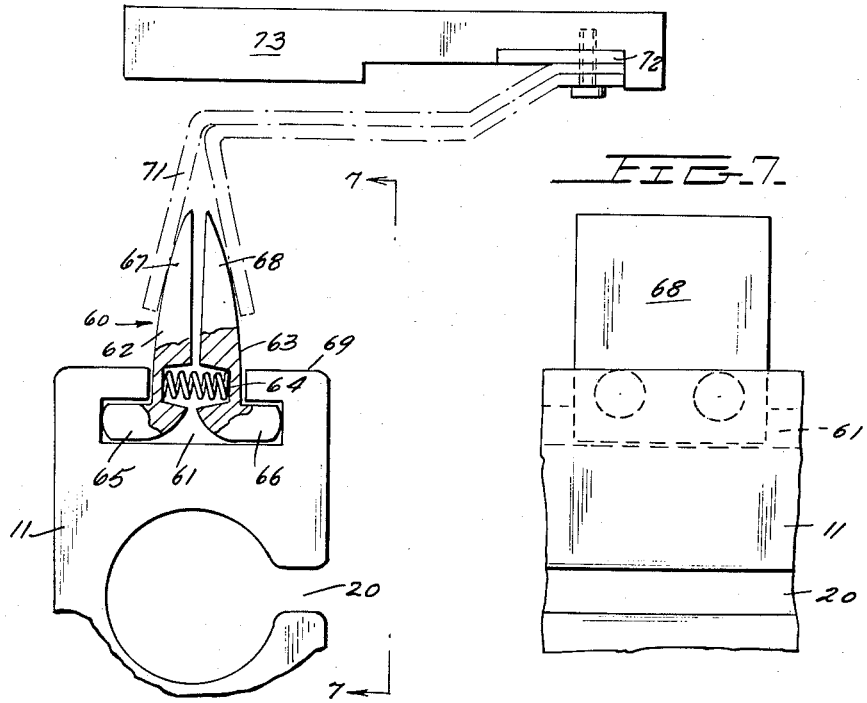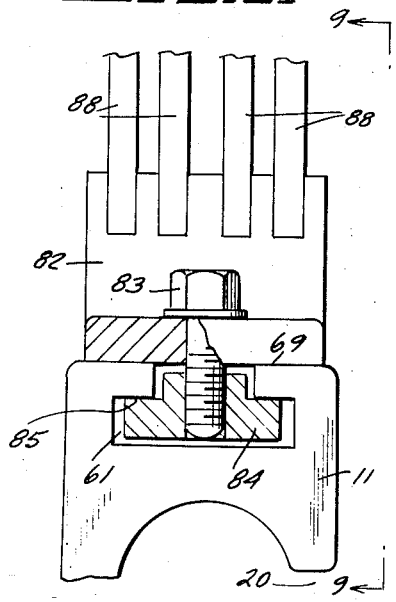

2,969,421
LOW X BUS

William M. Scott, Jr., Bryn Mawr, Pa., assignor to I-T-E Circuit Breaker Company, Philadelphia, Pa., a corporation of Pennsylvania Filed July 12, 1957, Ser. No. 671,646

10 Claims. (Cl. 174—117)

This invention relates to a bus structure having low reactance and in which the shape of the bus bars is such that they are mechanically interlocked against movement in a direction transverse to the longitudinal axis thereof.

In constructing a bus structure, the influence of the magnetic field surrounding one current carrying bus bar upon the other bus bars, generally referred to as the proximity effect, must be considered. That is, the magnetic field created by the current flowing in one bus bar will induce currents in the adjacent bus bars. The impedance of the bus structure is dependent in large measure upon the relative phase angles of the load current carried by a bus bar and the currents induced therein.

In the usual bus structure for the distribution of three phase power, the influences of the two outside conductors upon the center conductor will have very little net effect but the magnetic fields of the center and one outside conductor will have a considerable net effect upon the other outside conductor resulting in an unequal current distribution throughout the cross-section of the bus bar.

The overall effect on the bus structure will be the presence of unequal voltages at each phase making for inefficient operation of equipment being fed by the bus structure as well as an increase in the losses within the bus structure.

Another problem to be considered in bus structure constructions is the attracting or repelling forces between adjacent current carrying bus bars caused by the interaction of their magnetic fields. The problem is particularly acute under short-circuit conditions since the forces between conductors increases as the square of the currents. Forces reaching magnitudes of tons per foot are not unusual.

The reactance losses of the bus bars and the forces therebetween are substantially eliminated when the geometric mean centers of adjacent conductors coincide. One prior art method toward meeting this ideal condition is a coaxial arrangement of tubular conductors. However, it is difficult to tap power therefrom and difficult to connect sections end-to-end.

A second prior art arrangement comprises splitting the three phases of the electrical system among six, nine, or twelve flat conductors which are positioned in an interlaced fashion with parallel connections being made at equal distances along the length. Tapping power from the second arrangement is still inconvenient and separate provisions for lateral bracing must be provided.

The instant invention provides a bus structure in which the shape of the bus bars is such that they are mechanically interlocked against transverse movement and the geometric mean centers are brought into reasonable proximity to reduce the reactance losses caused by the proximity effect.

Each bus bar comprises an elongated, preferably extruded, member with a cross-section including a rectangular body section and a locking element. The locking element has a dimension, taken along a line parallel to the juncture line between the body section and locking element, which is larger than the dimension of the juncture line. A locking groove is cut in the body section to receive the locking element of a second bus bar. The locking groove is of substantially the same shape as the locking element but is slightly larger to also receive a member which insulates the bus bars from one another.

The juncture is on a first side of the body section while the locking groove communicates with a second side of the body section which is opposite the first side. In this manner the locking element of a third bus together with an insulating means is received by the locking groove of the second bus bar to form a compact interlocked bus structure.

Power may be conveniently tapped from this arrangement since at least one side of the body section of each bus bar is readily accessible for its entire length. For convenience in mounting the structure to the insulating means and also for tapping energy therefrom, T-shaped slots are cut therein. The legs of the T-slots communicate with opposite surfaces of the body section and the arms are positioned below these surfaces.

With this arrangement, the geometric mean centers of adjacent bus bars are brought close together, reducing the reactance losses and thereby equalizing the voltage drops in each bus bar. Furthermore, the bus bars are mechanically interlocked along their entire length against transverse movement thus eliminating the need for providing separate bracing means along the bus run. Only relatively weak mounting members need be provided at widely spaced intervals to insulate the bus structure from ground and to prevent longitudinal movement of the bus bars.

Accordingly a primary object of the instant invention is to provide a low reactance bus structure in which a single bus bar is provided for each phase of the power system.

Another object is to provide a bus structure in which the conductors are shaped to be mechanically interlocked along their entire length against transverse movement.

Still another object is to provide a bus structure in which the geometric mean centers of the bus bars are closely spaced.

A further object is to provide a compact bus structure from which power may be conveniently tapped and in which the bus bars may be conveniently connected end to end.

A still further object is to provide a bus structure in which each bus bar comprises a body and a locking element with the body having a locking groove cut therein to receive the locking element of the adjacent bus bar to interlock the bus bars and provide support along substantially the full length thereof thereby eliminating the necessity for providing separate bracing members spaced along the length of the bus run.

These and other objects of this invention will become apparent after reading the following description of the accompanying drawings in which:

Figure 1 is a perspective view of a bus bar of the instant invention.

Figure 2 is a transverse cross-sectional view of a bus structure utilizing the bus bars of Figure 1.

Figure 3 is a side elevation illustrating a means of connecting the bus bars of Figure 1 end-to-end.

Figure 4 is a transverse cross-section of a second bus structure utilizing the bus bars of Figure 1.

Figure 5 is a transverse cross-section of the bus structure illustrated in Figure 4 in which the shape of the bus bars has been modified.

Figure 6 is a transverse cross-section of the bus bar of Figure 1 with a power tapping means attached thereto, Figure 7 is a side elevation of Figure 6 looking in the the direction of arrows 7—7.

Figure 8 is a transverse cross-section of the bus bar of Figure 1 with another power tapping means attached thereto.

Figure 9 is a side elevation of Figure 8 looking in the direction of arrows 9—9.

Referring most particularly to Figures 1 and 2, bus structure 10 comprises three hot bus bars 11a, 11b, 11c and a ground bus bar 12 together with thin electrical insulating members 13 interposed between adjacent bus bars. Each of the hot bus bars 11a, 11b, 11c are identical members illustrated in the perspective view of Figure 1 as bus bar 11.

Bus bar 11 is an elongated member, preferably formed by extrusion, comprising a substantially rectangular body 15 and a locking element 16 projecting from a surface 19 thereof. Locking element 16 includes a cylindrical portion 17 and a connecting portion 18 which is interposed between cylindrical portion 17 and body 15. Thickness T of body portion 18 is substantially less than the diameter of cylindrical portion 17 for a purpose to be hereinafter explained.

Locking groove 20 is cut in a second surface 21 of body 15 and has a cross-sectional shape substantially identical with that of locking element 16. However, locking groove 20 is slightly larger than locking element 16 since locking groove 20 must receive a locking element 16 as well as a thin insulating member 13.

Ground bus bar 12 is similar to hot bus bars 11a, 11b, 11c except that the cylindrical portion 17 has been replaced by an extended connecting portion which forms support extension 24.

Since connecting portion 18 is thinner than the diameter of cylindrical section 17, when the locking element 16 of bus bar 11c is positioned within locking groove 20 of bus bar 11b, bus bars 11b and 11c are interlocked along their entire length against movement transverse to the direction of the longitudinal axis. Similarly bus bar 11b is mechanically interlocked with bus bar 11a and bus bar 11a with ground bus bar 12. In this manner a compact bus structure 10 is formed in which distances between geometric mean centers of the bus bars 11a, 11b, 11c are considerably reduced over the devices of the prior art to thereby reduce the undesirable results of the proximity effect and reduce reactance losses of the bus structure 10.

While locking element 16 cooperates with locking groove 20 to prevent lateral movement between the bus bars 11a, 11b, 11c, 12, other means must be provided to prevent longitudinal movement. Such means comprise a clamp element 27 which nests in the arms of T-shaped mounting channel 28. Screw 29 extends through countersunk hole 31 in insulated support block 30 and is received by a tapped hole in clamp element 27.

Clockwise rotation of screw 29 draws clamp element 27 toward support block 30 drawing bus bar 12 firmly against support block 30. Bus bars 11a, 11b, 11c are similarly secured to support block 30 so that longitudinal movement of the bus bars 11a, 11b, 11c, 12 is thereby prevented. Slots 34 are provided in support block 30 to accommodate the ends of thin insulating members 13 which extend beyond the bus bars to lengthen the creepage path therebetween.

Support block 30 is secured to bracket 32 which in turn is secured to a fixed support in any suitable manner. Should additional support be required, support extension 24 of ground bus bar 12 may be secured to auxiliary bracket 33 which is also secured to the fixed support.

Two bus bars 11e and 11f may be conveniently connected end to end as illustrated in Figure 3 since the ends of each bus bar 11 include complementary formations, as at 38, 39. Bus bar 11e rests on the slightly raised portion 41 of block 40. Formation 39 of bus bar 11f rests on formation 38 of bus bar 11e and is drawn toward block 40 by clamp element 42 and screw 43 as hereinbefore explained in connection with the means to prevent longitudinal movement of the bus bars. In this manner bus bars 11e and 11f are forced together in high pressure contact to form a good electrical connection therebetween.

Figure 4 illustrates another bus arrangement wherein the ground bus bar 12 of Figure 2 is eliminated and one of the hot bus bars 11a is split into two sections 51, 52. Section 52 is substantially the same shape as locking element 16 while section 51 is substantially the same shape as body 15. Sections 51 and 52 are electrically connected at the generator and load ends and at points in between as required.

It should be apparent to those skilled in the art that the hot bus bars 11a, 11b, 11c need not be formed in the exact cross-sectional shape as illustrated in Figures 1 and 2. Instead, the body 15 and locking element 16 may be varied considerably in shape. For example, the locking element may comprise a trapezoid (Figure 5) 25 which is connected to the body 26 at the shorter parallel side of the trapezoid.

Power may conveniently be tapped from bus structure 10 since one surface of each bus bar is readily accessible along its entire length and all of these surfaces are accessible from the same direction. The power taps may be accomplished by drilling and tapping the bus bars in the usual manner.

Figures 6 and 7 illustrate a convenient power tapping means 60 which cooperates with T-shaped mounting or power tapping channel 61 which is identical to mounting channel 28. Power tapping means 60 comprise two L-shaped members 62, 63 in slightly spaced back to back position with a biasing spring 64 urging L-shaped members 62, 63 apart. Legs 65, 66 of L-shaped members 62, 63 respectively, are positioned within the wide sections of T-shaped tapping channel 61 with the bodies 67, 68 of the L-members projecting beyond surface 69 of bus bar 11. Bodies 67, 68 are tapered down toward their free ends to form a wedge shape.

Inverted V-shaped connecting means 71, extending from line terminal 72 of circuit breaker 73, readily engages power tapping means 60 to form an electrical connection between the circuit breaker 73 and bus structure 10. Biasing springs 64 urge L-shaped members 62, 63 apart into good electrical contact with connecting means 71 as well as bus bar 11.

By merely pressing the L-shaped members 62, 63 together, power tapping means 60 may readily be moved longitudinally along the bus bar to a new position. The temperature of the bus bars at the points where power is being tapped will not rise as much with this power tapping arrangement as it would rise if the bus bar cross-sectional area were reduced to accomplish the power tap, as is the case of the usual power tapping arrangements which require drilling of the bus bars.

Figures 8 and 9 illustrate another convenient arrangement for tapping power from bus bar 11. The leg 81 of L-shaped member 80 rests upon surface 69 of bus bar 11. Screw means 83 passes through clearance holes in leg 81 and mates with tapped holes in clamp element 84 which is positioned within power tapping channel 61. By rotating screw means 83 in a clockwise direction, clamp element 84 will be drawn toward channel ceilings 85, 86 and leg 81 will be firmly seated on bus bar surface 69.

The body 82 of L-shaped member 80 projects from bus bar 11 to provide convenient means which may be engaged by contact fingers 87, 88 which are operatively connected to the line terminals of a circuit breaker (not shown). Suitable biasing means are included within contact housing 89 so that contact tips 90, 91 of contact fingers 87, 88 respectively, are urged toward one another.

Thus, this invention provides improved bus structures in which the bus bars are constructed so that they are mechanically interlocked along their entire length to provide support against short circuit forces. Further, the construction is such that the reactance losses are reduced and the voltages of the phases are equalized.

In the foregoing the invention has been described solely in connection with specific illustrative embodiments thereof. Since many variations and modifications of the invention will now be obvious to those skilled in the art, I prefer to be bound not by the specific disclosures herein contained but only by the appended claims.

I claim:

1. A bus structure comprising a plurality of parallel coplanar mechanically interlocked bus bars; each of said plurality of bus bars comprising an elongated body having a locking groove in a first surface and a locking member extending from a second surface opposite to said first surface; each of said locking grooves and each of said locking members extending along substantially the full length of their said respective bus bars; the cross-sectional configuration of said locking grooves being substantially the same as the cross-sectional configuration of said locking members; a plurality of insulating members; said locking member of said bus bars being nested within the said locking grooves of adjacent bus bars; at least one of said plurality of insulating members being interposed between each of said nested locking member and locking groove to electrically isolate said locking groove from said locking member; a power tapping channel cut in a third surface of each of said bus bars, positioned transverse to said surface, and extending parallel to the longitudinal axis of said bus bars; at least one power tapping means positioned within said power tapping channel; each of said power tapping means comprising a first and second L-shaped member and a biasing means urging said L-shaped members away from each other; each of said L-shaped members being arranged with their legs nested within a respective power tapping channel, pointing in opposite directions and positioned transverse to the longitudinal axis of their respective bus bar; the bodies of said L-shaped members being tapered down toward the free ends thereof to provide a wedge shaped means which may be conveniently engaged by complementary means secured to the line terminals of a circuit breaker.

2. A bus structure comprising a plurality of parallel coplanar mechanically interlocked bus bars, at least three in number; each of said plurality of bus bars comprising an elongated body having a locking groove in a first surface and a locking member extending from a second surface opposite to said first surface; each of said locking grooves and each of said locking members extending along substantially the full length of their respective bus bars; the cross sectional configuration of said locking grooves being substantially the same as the cross sectional configuration of said locking members; a plurality of insulating members; said locking members of said bus bars being nested within the locking grooves of adjacent bus bars; said locking members and locking grooves also being the means to thereby locate geometric mean centers of said mechanically interlocked bus bars in closer proximity to thereby reduce reactance losses of said bus structure; at least one of said plurality of insulating members being interposed between each of said locking members and the bus bars having the grooves within which the respective locking members are nested to electrically insulate said locking grooves from adjacent bus bars; each of said locking grooves having a cross-section including a first and a second dimension taken parallel to said second surface; said second dimension being greater than said first dimension and being positioned more remote from said first surface than said first dimension.

3. A bus structure as set forth in claim 2 with said cross section of said locking member including a substantially circular portion and a portion, whose thickness is substantially less than said circular portion diameter, connecting said substantially circular portion to its respective bus bar.

4. A bus structure as set forth in claim 2 with each of said bus bars having a mounting channel in a third surface and extending parallel to the longitudinal axes of the bus bars; said third surface being transverse to both said first and second surfaces; said mounting channel having a transverse cross-section such that an interior portion has a larger dimension than the opening at said third surface.

5. A bus structure as set forth in claim 2 wherein each of said bus bars includes a first and second channel in a third and fourth bus bar surface extending parallel to the longitudinal axes of the bus bars; said third surface being opposite to said fourth surface and being transverse to said first and second surfaces; each of said channels having a transverse cross-sectional area such that an interior portion has a larger dimension than the opening at said bus bar third and fourth surfaces.

6. A bus structure comprising a first, a second, and a third parallel coplanar mechanically interlocked bus bars; each of said bus bars having an elongated body; said first and second bus bars having a locking groove in a first surface extending along the full length thereof and positioned parallel to the longitudinal axes of these bus bars; said second and said third bus bars each having a locking member projecting from a second surface thereof; said locking members being of substantially the same shape as said locking grooves; said locking member of said third bus bar positioned within said locking groove of second said bus bar, and said locking member of said second bus bar positioned within said locking groove of said first bus bar to thereby mechanically interlock said bus bars; said locking members and locking grooves also being the means to thereby locate geometric mean centers of said mechanically interlocked bus bars in closer proximity to thereby reduce reactance losses of said bus structure; a plurality of insulating members positioned to electrically insulate said bus bars from one another; each of said locking grooves including a first and a second dimension taken parallel to said second surface; said second dimension being greater than said first dimension and being positioned more remote from said first surface than said first dimension.

7. A bus structure as set forth in claim 6 wherein each of said locking members has a cross-section including a substantially circular portion and a portion, whose thickness is substantially less than said circular portion diameter, connecting said substantially circular portion to its respective bus bar.

8. A bus structure as set forth in claim 6 wherein said first bus bar has a projection extending from a surface opposite said locking groove, extending along the full length of the first bus bar and positioned parallel to the longitudinal axis of the first bus bar.

9. A bus structure as set forth in claim 8 wherein said projection of said first bus bar contains a plurality of apertures extending perpendicular to the plans of said projection of said first bus bar; said apertures being adapted to receive means for mechanically securing said bus structure.

10. A bus structure as set forth in claim 6 wherein each of said bus bars includes a first and a second channel in a third and a fourth bus bar surface, respectively, extending parallel to the longitudinal axes of said bus bars; said third surface being transverse to said first and said second surfaces; each of said channels having a transverse cross-sectional area such that an interior portion has a larger dimension than the opening at said bus bar third and fourth surfaces.

(References on following page)

References Cited in the file of this patent

UNITED STATES PATENTS

| | | |
|---|---|---|
| 455,339 | Knight | July 7, 1891 |
| 630,697 | Highfield et al. | Aug. 8, 1899 |
| 1,802,302 | Zagorski | Apr. 21, 1931 |
| 1,996,186 | Affel | Apr. 2, 1935 |
| 2,039,025 | Papst | Apr. 28, 1936 |
| 2,232,222 | Flinn | Feb. 18, 1941 |
| 2,274,136 | Frank et al. | Feb. 24, 1942 |
| 2,626,301 | Hammerly | Jan. 20, 1953 |

OTHER REFERENCES

Germany (German specification) Auslegeschrift 1,000,543, Jan. 10, 1957.